(12) United States Patent
Schellens (10) Patent No.: US 11,654,812 B2
(45) Date of Patent: May 23, 2023

(54) VEHICLE MOUNTING PLATFORM USING VEHICLE APPLIQUE

(71) Applicant: Thomas E. Schellens, Old Lyme, CT (US)

(72) Inventor: Thomas E. Schellens, Old Lyme, CT (US)

( * ) Notice: Subject to any disclaimer, the term of this patent is extended or adjusted under 35 U.S.C. 154(b) by 314 days.

(21) Appl. No.: 17/097,304

(22) Filed: Nov. 13, 2020

(65) Prior Publication Data

US 2021/0155138 A1 May 27, 2021

Related U.S. Application Data

(60) Provisional application No. 62/941,562, filed on Nov. 27, 2019.

(51) Int. Cl.
*B60R 11/00* (2006.01)
*B60N 3/00* (2006.01)
*B60Q 1/00* (2006.01)
*B60Q 1/44* (2006.01)
*B60Q 1/26* (2006.01)

(52) U.S. Cl.
CPC ........... *B60N 3/001* (2013.01); *B60Q 1/0017* (2013.01); *B60Q 1/2611* (2013.01); *B60Q 1/44* (2013.01); *B60R 11/00* (2013.01); *B60R 2011/0043* (2013.01)

(58) Field of Classification Search
CPC .... B60N 3/001; B60Q 1/0017; B60Q 1/2611; B60Q 1/44; B60Q 1/263; B60Q 1/302; B60R 11/00; B60R 2011/0043
USPC ......................................................... 296/215
See application file for complete search history.

(56) References Cited

U.S. PATENT DOCUMENTS

| | | | |
|---|---|---|---|
| 8,511,526 B2 | 8/2013 | Schellens | 224/326 |
| 9,162,628 B2 | 10/2015 | Schellens | B60R 9/04 |
| 10,479,282 B2 | 11/2019 | Schellens | B60R 9/04 |
| 2018/0224247 A1* | 8/2018 | Davies | B32B 7/12 |
| 2018/0252382 A1* | 9/2018 | Schellekens | B32B 27/08 |
| 2022/0072992 A1* | 3/2022 | Snider | B60Q 1/268 |
| 2022/0380248 A1* | 12/2022 | Li | B60R 11/00 |

* cited by examiner

*Primary Examiner* — Pinel E Romain
(74) *Attorney, Agent, or Firm* — Fattibene and Fattibene, LLC; Paul A. Fattibene (57) ABSTRACT

A mounting platform having shaped front clips and back tabs. The mounting platform is adapted or configured to mount onto an applique attached to a vehicle without making any modifications to the vehicle. The front clips and back tabs are positioned and adapted or configured to attach to the applique or correspond with original fasteners used to hold the applique to the vehicle. The mounting platform is attached the applique without making any additional openings or holes in the vehicle.

11 Claims, 8 Drawing Sheets

VEHICLE MOUNTING PLATFORM USING VEHICLE APPLIQUE

RELATED APPLICATION

This application claims the benefit of U.S. Provisional Application No. 62/941,562 filed Nov. 27, 2019 which is herein incorporated by reference.

FIELD OF THE INVENTION

The present invention relates in general to the attachment of vehicle accessories, and more particularly to the attachment of vehicle accessories without modification or damage to the vehicle.

BACKGROUND OF THE INVENTION

There are many situations where an accessory is desired to be attached to a vehicle. It is often desired to attach light bars, emergency lights, antennas or other accessories to a vehicle and, in particular, to the roof of a vehicle. Often, in order to attach these accessories, holes must be drilled in the vehicle, such as in the roof, so as to mount the accessory. The mounting of the accessory by drilling holes damages the surface of the vehicle and lowers the resale value. Additionally, it is often difficult to return the vehicle to the original condition due to the damage caused by mounting the accessory. In many situations, the accessory is only needed for a short period of time. Therefore, it is often desirable to mount and then remove the accessory without modifying or permanently altering or damaging the vehicle. This is particularly applicable to volunteer emergency personnel who may volunteer for a period of time using their own vehicles that must be modified to mount emergency lights.

While there have been techniques to temporarily mount emergency lights with magnets and suction cups, they often do no hold sufficiently and therefore often become detached unintentionally. Therefore, there is a need for the mounting of accessories on a vehicle that is secure and that yet will not damage the vehicle or require permanent alteration to the vehicle, such as the drilling of additional holes in the vehicle.

A vehicle mounting platform that helps to solve some of these problems is disclosed in U.S. Pat. No. 9,162,628 entitled "Vehicle Mounting Platform Using Existing Opening" issuing Oct. 20, 2015 to Thomas E. Schellens, which is herein incorporated by reference. Therein disclosed is a vehicle mounting platform that is mounted in an existing brake light opening of the vehicle. Another mounting platform is disclosed in U.S. Pat. No. 10,479,282 entitled "Accessory Mount for a Vehicle" issuing Nov. 19, 2019 to Thomas E. Schellens, which is herein incorporated by reference. Therein disclosed is an accessory mount mountable to the roof of a vehicle using an existing brake light opening. A clamp rotates the mounting surface against the roof of the vehicle.

While these devices are useful and securely attach accessories to a vehicle, it they are not suitable to some vehicles or in some applications. Therefore, there is a need for different vehicle mounting platforms that can be easily and removably attached to a vehicle without modifying or damaging the vehicle.

SUMMARY OF THE INVENTION

The present invention provides a mounting platform that is securely attached to a vehicle through clamping or clipping onto an existing applique portion of the vehicle. A mounting platform is attached to the vehicle through clamping onto an existing applique of the vehicle, such as the rear spoiler located above the rear window of the vehicle. The mounting platform has retaining tabs or clips that hook over the forward edge of the vehicle applique and fasten to the applique using existing fasteners used in the appliques construction. The mounting platform, once attached, provides a flat and level platform above the applique for mounting accessories such as emergency lights, light bars, antennas or other similar accessories. The present invention is particularly adaptable to the mounting of a mounting platform on the roof of a truck having a spoiler applique.

Accordingly, it is an object of the present invention to attach an accessory to an applique on a vehicle without modifying or damaging the vehicle.

It is an advantage of the present invention that the mounting platform may be easily installed and removed.

It is a further advantage of the present invention that the mounting platform may be attached to the vehicle without the drilling of any additional holes.

It is a feature of the present invention that it uses an existing surface and fasteners in the vehicle to securely attach the mounting platform.

It is another feature of the present invention that shaped front clips attached to a front portion of the mounting platform slide onto the forward edge of the applique and are fastened to the applique using existing fasteners used in the original construction and attachment of the applique to the vehicle.

It is yet another feature of the present invention that back tabs attached to a back portion of the mounting platform fit between the applique and a brake light assembly on the applique and are fastened to the applique using existing fasteners used in the original construction and attachment of the applique to the vehicle.

It is a further feature of the present invention that a mounting surface is formed on the mounting platform for attachment of accessories, such as emergency lights.

These and other objects, advantages, and features will become readily apparent in view of the following more detailed description.

DETAIL DESCRIPTION OF THE PREFERRED EMBODIMENT

Figure 1:
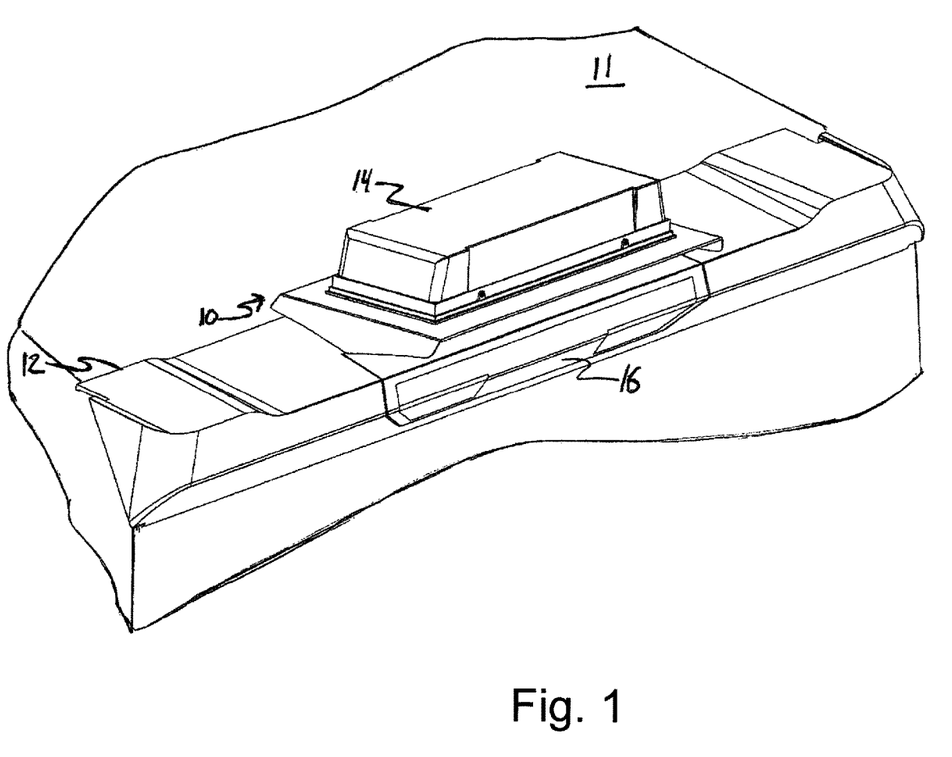
FIG. 1 is a perspective view schematically illustrating a mounting platform attached to an applique portion of the roof of a truck or vehicle.

FIG. 1 schematically illustrates the mounting platform 10 attached to the roof 11 of vehicle, such as an automobile or pickup truck. The automobile or pickup truck has an applique fairing 12 which is often referred to in the automotive trade as a spoiler, which generally refers to an applied form at the rear edge of the automobile or pickup truck roof. The applique 12 is often fastened to the automobile or pickup truck with a series of bolts or fasteners mounting from the interior of the automobile or pickup truck. The applique 12 may be considered any attachment to the vehicle, automobile, or pickup truck that may be removed and reinstalled without modifying the vehicle or applique 12. The mounting platform 10 is attached to the applique 12 with a series of clips or fasteners at the front and back of the mounting platform 10. A light bar or emergency lights 14 may be mounted on the mounting platform 10. Other accessories such as emergency lights, antennas, or and any other accessory desired, may be mounted on the mounting platform 10.

Figure 2:
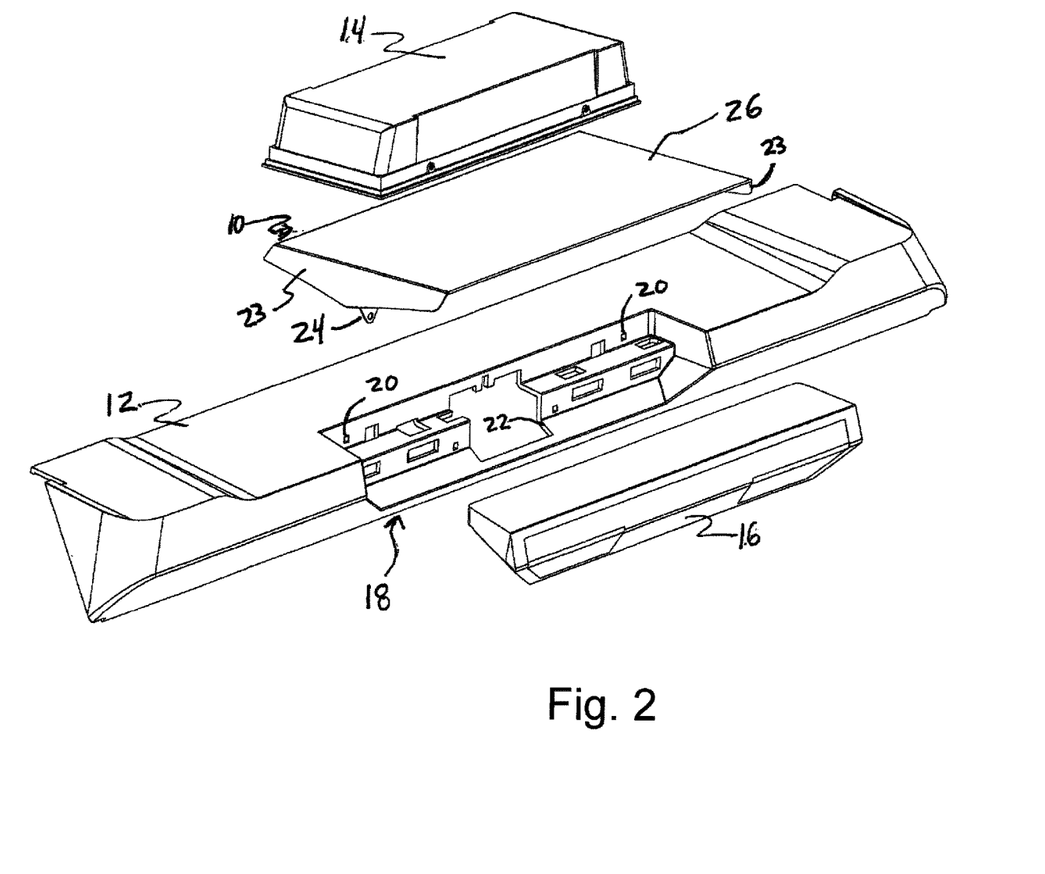
FIG. 2 is a perspective exploded view schematically illustrating the attachment of a mounting platform onto the roof of a truck or vehicle.

FIG. 2 is an exploded perspective view illustrating the mounting platform 10. The mounting platform 10 comprises a shape that includes mounting surface 26 for mounting a light bar or emergency lights 14 thereon. The mounting platform has side panels 23. The mounting platform 10 has a plurality of back tabs 24 fitting within the brake light recess 18. The back tabs 24 are positioned and adapted to be fixed to the applique 12 by a fastener placed through hole 20 in the applique 12. Hole 20 may also be used to attach the brake light housing 16 to the applique 12. An access opening 22 is placed in the applique 12 to permit access and for electrical wires for brake lights in the brake light housing 16.

Figure 3:
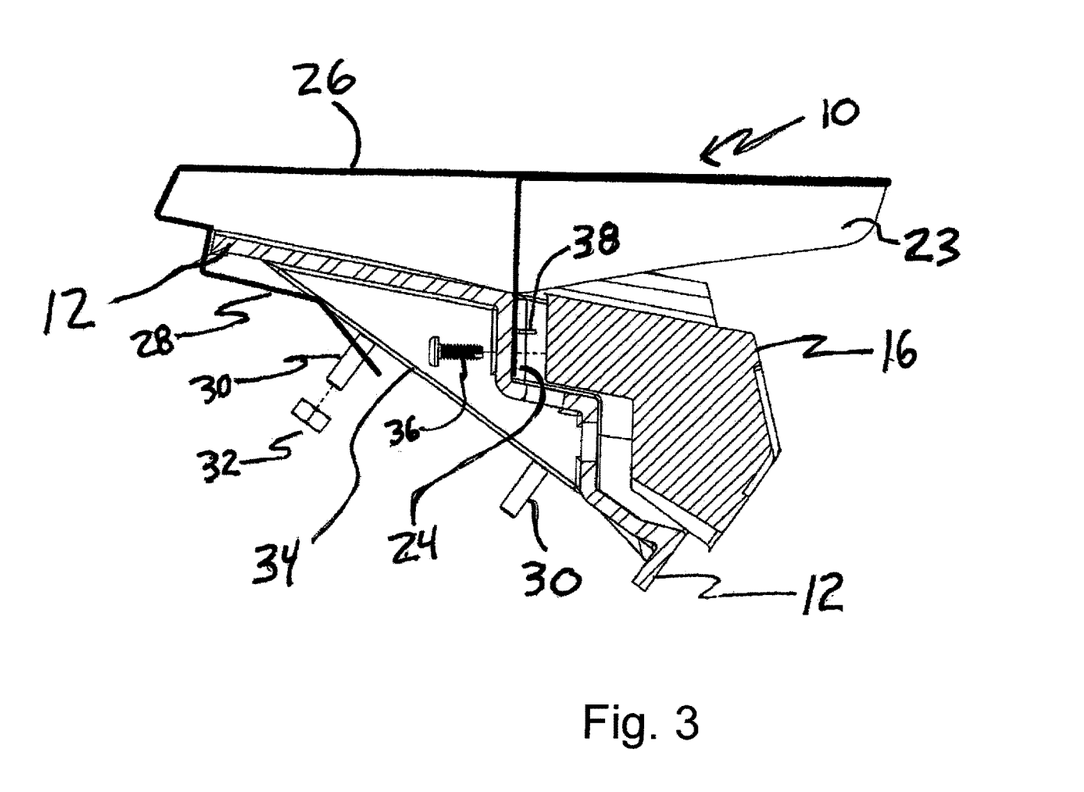
FIG. 3 schematically illustrates a partial cross-section of the mounting platform attached to a vehicle.

FIG. 3 is a cross section illustrating the mounting platform 10 placed in position on the applique 12. The applique 12 is attached to the vehicle, preferably on the roof. The mounting platform 10 is attached to the applique 12 with shaped front clip 28 and back tab 24. The front clips 28 are positioned and adapted to attach to the existing studs or bolts 30 of the applique 12. Nut 32 may be used to securely hold the mounting platform 10 onto the vehicle as well as the front clips 28. The studs or bolts 30 are attached to the support plate 34 used in attaching the applique to the vehicle. The back tabs 24 are positioned and adapted be placed between the applique 12 and the brake light housing 16 and attach with a fastener 36 to the applique 12. A spacer tab 38 may be used to maintain a space or gap between the applique 12 and the brake light housing 16 so as to run wires to any accessory mounted on the mounting surface 26.

Figure 4:
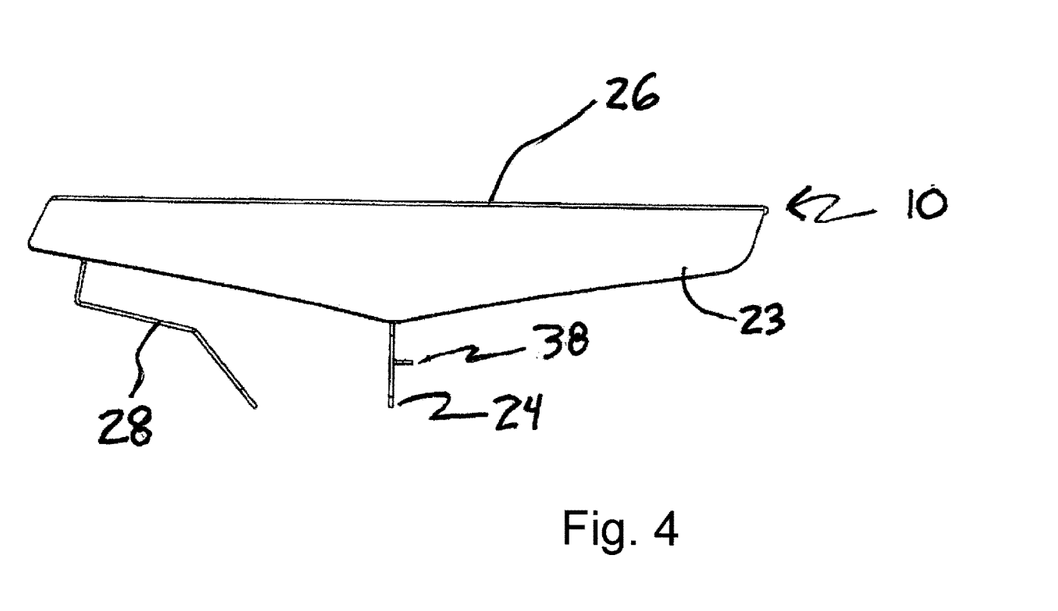
FIG. 4 is a side elevational view of the mounting platform.

FIG. 4 is a side elevational view of the mounting platform 10. Features of the mounting platform 10 are more clearly illustrated in FIG. 4. Shaped front clip 28 and back tab 24 are clearly illustrated. The spacer tab 38 is also more clearly illustrated.

Figure 5:
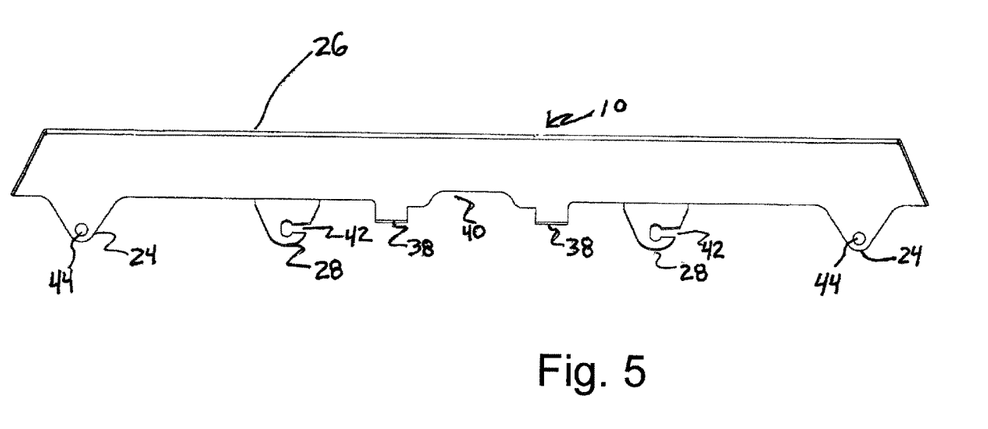
FIG. 5 is a rear elevational view of the mounting platform.

FIG. 5 is a rear elevational view of the mounting platform 10. Features of the shaped front clips 28 are more clearly illustrated. Shaped front clips 28 have a shaped keyhole slots 42 on the distal end. The key hole slots 42 permit the front clips 28 to be placed on the stud or bolt 30 illustrated in FIG. 3. This securely holds the front of the mounting platform 10 to the applique 12 and correspondingly to the vehicle roof 11 without the need to modify the vehicle. A cutaway 40 provides access to the access opening 22 in the applique 12 illustrated in FIG. 2. Therefore, electrical wires for the brake light housing and other areas may still be accessed after the mounting platform 10 is attached to the applique 12. The back tabs 24 have holes 44 therein. The back tabs 24 are configured and positioned to coincide with holes 20 in the applique 12, illustrated in FIG. 2. This makes possible for the mounting platform 10 to be attached to the applique 12 without making any modifications to the applique 12 or the vehicle roof 11 on which the applique 12 is originally attached. The spacer tabs 10 have a ninety-degree extension that acts as a spacer to provide a space between the applique 12 and the brake light housing 16. This permits electrical wires to be routed through the space and onto the mounting surface 26 to provide electrical connections for any accessory mounted thereon. As clearly illustrated in FIG. 5 the back tabs 24, front clips 28, and the spacer tabs 38 may all be separate and at different locations. However, features of each of the different back tabs 24, front clips 28, and the spacer tabs 38 may be combined or placed on different tabs. For example, features of the spacer tabs 38 may be combined with the back tabs 24 so that the spacer tabs 38 have a ninety-degree extension that acts as a spacer.

Figure 6:
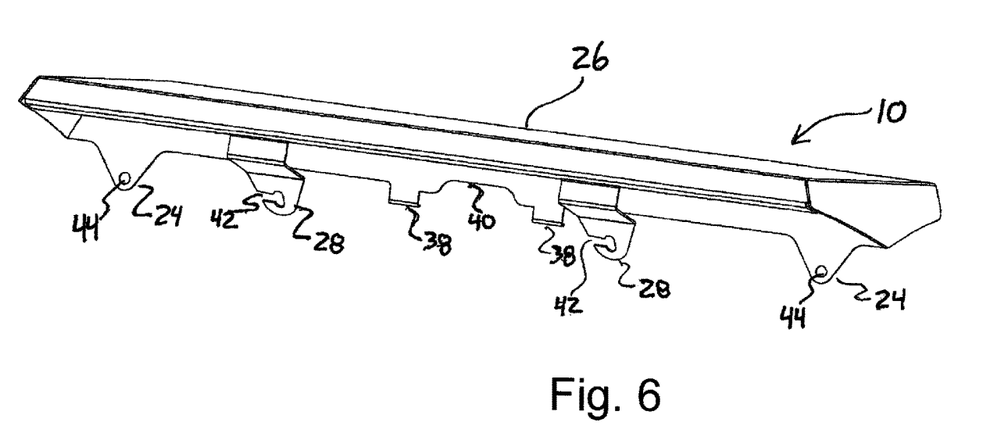
FIG. 6 is a front perspective view of the mounting platform.

FIG. 6 is a perspective front view of the mounting platform 10 that more clearly illustrates the shaped front clips 28. The front clips 28 are shaped to extend around a bottom portion of the applique 12 contact a support plate 34, illustrated in FIG. 3, on the applique 12 and angled to attach to a stud 30 fixing the applique 12 to the vehicle roof 11, illustrated in FIG. 1. The keyhole slot 42 attaches to the stud 30, illustrated in FIG. 3.

Figure 7:
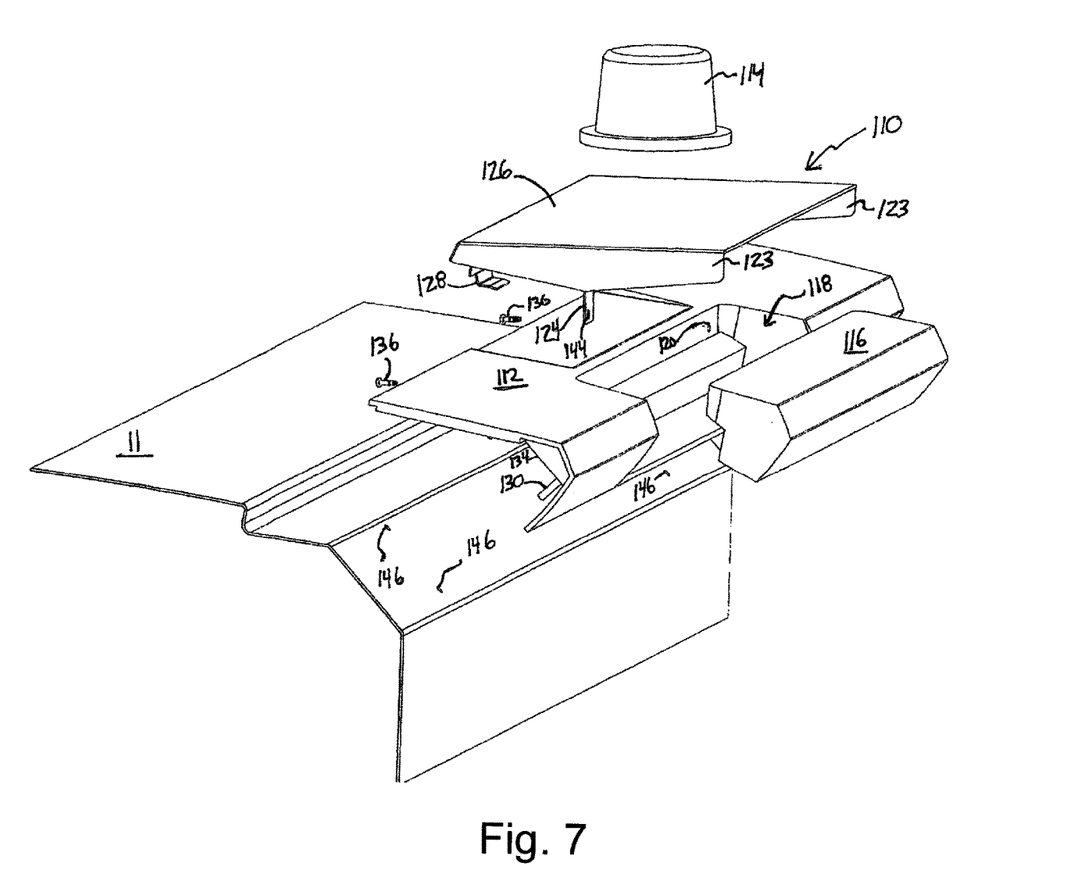
FIG. 7 is a perspective exploded view schematically illustrating the attachment of a second embodiment of a mounting platform onto the roof of a truck or vehicle.
Figure 8:
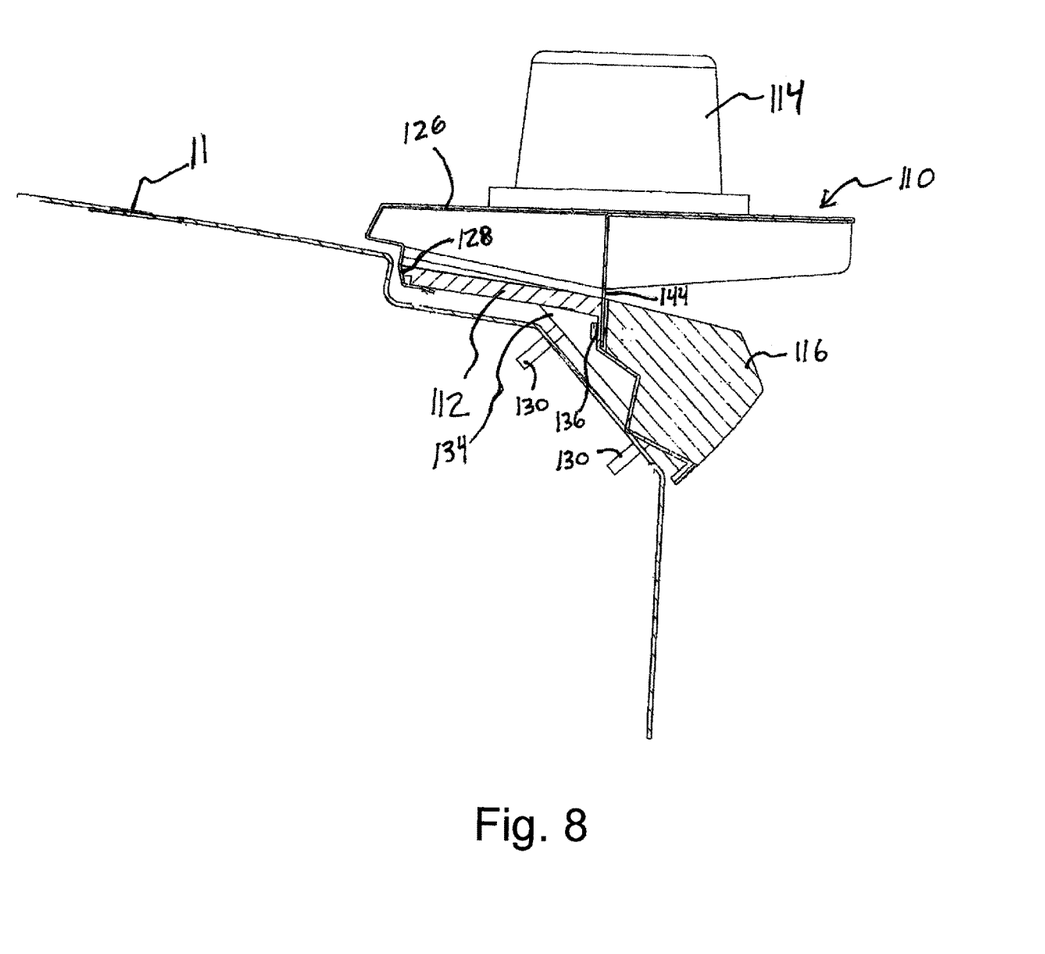
FIG. 8 is a partial cross section of the second embodiment of a mounting platform attached to the roof of a truck or vehicle.

FIGS. 7 and 8 illustrate a second embodiment of the present invention. In this embodiment the mounting platform 110 has different shaped front clips 128 that extend around the front of the applique 112. The mounting platform 110 has a mounting surface 126 for placement of an emergency light 114 or other accessory. The applique 112 is attached to the roof 11 by studs or bolts 130 placed in holes 146. The applique 112 has a brake light opening 118 with a screw or bolt hole 120 used for attaching the brake light housing 116. Back tabs 124 adjacent each side panel 123 extend downward between the brake light opening 118 and the brake light housing 116. The position of hole 144 in each of the back clips 124 correspond or coincide with the screw or bolt holes 120 so as to hold a back portion of the mounting platform 110 onto the applique 112 when the brake light housing is reinstalled on the applique 112. A front portion of the mounting platform 110 is held on the applique 112 by shaped front clips 128. The shaped front clips 128 have a shape corresponding to a front profile of the mounting platform 110 and a portion of the front clips 128 extend under the applique 112 between the vehicle surface or roof 11 and a bottom portion for applique 112.

The combination of the shaped front clips 128 and the back tabs 124 securely hold the mounting platform 110 onto the applique 112 without modifying the vehicle surface or roof 11 or the applique 112. Therefore, the mounting platform 110 of the present invention may be securely attached and removed from the vehicle without any modification to the vehicle, and especially without drilling or making any additional holes in the vehicle or applique 112.

The mounting platform of the invention permits attachment to an existing applique attached to the vehicle without any additional attachments to the vehicle other than the existing applique. Therefore, the mounting platform of the invention may be securely attached and easily removed from the vehicle without any permanent modification to vehicle.

While the present invention has been described with respect to several different embodiments, it will be obvious that various modifications may be made without departing from the spirit and scope of this invention.

What is claimed is:

1. A vehicle applique attachment for mounting on a vehicle having an applique attached to the vehicle comprising:
   a mounting platform;
   a mounting surface formed on said mounting platform;

a front clip attached to said mounting platform, said front clip shaped to extend under a front portion of the applique; and a back tab attached to said mounting platform, said back tab positioned to coincide with a back attachment point of the applique attached to the vehicle, whereby said mounting platform attaches to the applique without any modification to the vehicle.

2. The vehicle applique attachment for mounting on a vehicle having an applique attached to the vehicle as in claim 1 wherein:

said front clip is shaped and positioned to attach to a front attachment point of the applique attached to the vehicle.

3. The vehicle applique attachment for mounting on a vehicle having an applique attached to the vehicle as in claim 2 wherein:

said front clip has a distal end with a keyhole slot.

4. The vehicle applique attachment for mounting on a vehicle having an applique attached to the vehicle as in claim 1 further comprising:

a spacer tab attached to said mounting platform.

5. The vehicle applique attachment for mounting on a vehicle having an applique attached to the vehicle as in claim 1 further comprising:

a spacer tab attached said back tab.

6. The vehicle applique attachment for mounting on a vehicle having an applique attached to the vehicle as in claim 1 wherein:

said front clip configured to attach to a fastener attaching the applique to the vehicle.

7. The vehicle applique attachment for mounting on a vehicle having an applique attached to the vehicle as in claim 1 wherein:

said back tab configured to extend into a brake light recess formed in the applique.

8. The vehicle applique attachment for mounting on a vehicle having an applique attached to the vehicle as in claim 1 wherein:

said back tab has an opening configured to align with a hole formed in the applique when said mounting platform is positioned on the applique.

9. The vehicle applique attachment for mounting on a vehicle having an applique attached to the vehicle as in claim 8 further comprising:

a brake light attached with a fastener passing through the opening in said back tab.

10. A vehicle applique attachment for mounting on a vehicle having an applique attached to the vehicle comprising:

a vehicle;

an applique attached to said vehicle;

a brake light housing removable attached to said applique with a brake light fastener at a brake light housing attachment point;

a mounting platform;

a mounting surface formed on said mounting platform;

a front clip attached to said mounting platform, said front clip shaped to extend under a front portion of said applique; and a back tab attached to said mounting platform, said back tab inserted between said applique and said brake light housing and positioned to coincide with the brake light housing attachment point and held with the brake light fastener, whereby said mounting platform attaches to said applique without any modification to said vehicle.

11. A mounting platform attached to a roof of a vehicle having a spoiler applique comprising:

a vehicle having a rear, over window, applique, the applique which is mechanically attached and removable, the applique has a leading edge which may be captured by retaining tabs and be reinstalled, the applique which has additional points of attachment, including fasteners in the applique, whereby the mounting platform may be drawn against the spoiler applique securely holding the mounting platform on the vehicle; and a mounting surface, whereby an accessory may be mounted on the mounting surface and the mounting platform may be attached to the vehicle without the drilling of any additional holes.

* * * * *